US011970757B2

(12) United States Patent
Vidovic et al.

(10) Patent No.: US 11,970,757 B2
(45) Date of Patent: *Apr. 30, 2024

(54) ELECTRIC STEEL STRIP OR SHEET FOR HIGHER FREQUENCY ELECTRIC MOTOR APPLICATIONS, WITH IMPROVED POLARIZATION AND LOW MAGNETIC LOSSES

(71) Applicants: ThyssenKrupp Steel Europe AG, Duisburg (DE); thyssenkrupp AG, Essen (DE)

(72) Inventors: Anton Vidovic, Essen (DE); Karl Telger, Coesfeld (DE); Olaf Fischer, Bochum (DE); Nina Maria Winkler, Essen (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 255 days.

This patent is subject to a terminal disclaimer.

(21) Appl. No.: 17/292,114

(22) PCT Filed: Nov. 7, 2019

(86) PCT No.: PCT/EP2019/080537
§ 371 (c)(1),
(2) Date: May 7, 2021

(87) PCT Pub. No.: WO2020/094787
PCT Pub. Date: May 14, 2020

(65) Prior Publication Data
US 2021/0395866 A1 Dec. 23, 2021

(30) Foreign Application Priority Data
Nov. 8, 2018 (WO) .................. PCT/EP2018/080598

(51) Int. Cl.
C22C 38/26 (2006.01)
C21D 8/02 (2006.01)
C21D 9/46 (2006.01)
C22C 38/02 (2006.01)
C22C 38/04 (2006.01)
C22C 38/06 (2006.01)
C22C 38/22 (2006.01)
C22C 38/24 (2006.01)

(52) U.S. Cl.
CPC ............ *C22C 38/26* (2013.01); *C21D 8/0205* (2013.01); *C21D 8/0226* (2013.01); *C21D 8/0236* (2013.01); *C21D 9/46* (2013.01); *C22C 38/02* (2013.01); *C22C 38/04* (2013.01); *C22C 38/06* (2013.01); *C22C 38/22* (2013.01); *C22C 38/24* (2013.01)

(58) Field of Classification Search
CPC ........ C21D 8/0205; C21D 6/008; C21D 9/46; C21D 1/34; C21D 8/1233; C21D 8/0236; C21D 8/0226; C21D 8/1272; C22C 38/02; C22C 38/04; C22C 38/06; C22C 38/18; C22C 38/14; C22C 38/34; C22C 38/26; C22C 38/24; C22C 38/22; H01F 1/14775; H01F 1/16; Y02P 10/25
USPC .......................................................... 420/110
See application file for complete search history.

(56) References Cited

U.S. PATENT DOCUMENTS

| | | | |
|---|---|---|---|
| 6,582,528 B1 | 6/2003 | Bohm et al. | |
| 7,922,834 B2 * | 4/2011 | Tanaka .................. | C22C 38/004 148/306 |
| 11,041,222 B2 * | 6/2021 | Fischer .................. | C22C 38/06 |
| 2002/0043299 A1 | 4/2002 | Tanaka et al. | |
| 2003/0188805 A1 | 10/2003 | Friedrich et al. | |
| 2005/0067053 A1 | 3/2005 | Friedrich et al. | |
| 2005/0247373 A1 | 11/2005 | Hammer et al. | |
| 2009/0202383 A1 | 8/2009 | Tanaka et al. | |
| 2010/0158744 A1 | 6/2010 | Murakami | |
| 2013/0125601 A1 | 5/2013 | Kubota et al. | |
| 2013/0263981 A1 | 10/2013 | Zaizen et al. | |
| 2014/0083573 A1 | 3/2014 | Dorner et al. | |
| 2014/0227127 A1 | 8/2014 | Natori et al. | |
| 2015/0013844 A1 | 1/2015 | Xie et al. | |
| 2015/0059929 A1 | 3/2015 | Zaizen et al. | |
| 2016/0017467 A1 | 1/2016 | Balichev et al. | |
| 2016/0203897 A1 | 7/2016 | Dorner et al. | |
| 2017/0194082 A1 | 7/2017 | Murakami et al. | |
| 2017/0260600 A1 | 9/2017 | Okubo et al. | |
| 2018/0002776 A1 | 1/2018 | Kano et al. | |
| 2018/0030558 A1 | 2/2018 | Okubo et al. | |
| 2018/0355454 A1 | 12/2018 | Okubo et al. | |

(Continued)

FOREIGN PATENT DOCUMENTS

| | | |
|---|---|---|
| CN | 1078270 A | 11/1993 |
| CN | 100999050 A | 7/2007 |

(Continued)

OTHER PUBLICATIONS

NPL: on-line translation of JP 2013010982 A1, Jan. 2013 (Year: 2013).*

(Continued)

*Primary Examiner* — Jie Yang
(74) *Attorney, Agent, or Firm* — The Webb Law Firm

(57) ABSTRACT

A non-oriented electrical steel strip or sheet having the following composition, in percent by weight: 3.2 to 3.4 of Si, 0.85 to 1.1 of Al, 0.07 to 0.18 of Mn, 0.01 to 0.04 of P, 0.0003 to 0.0030 of S, 0.0005 to 0.0020 of N, 0.0010 to 0.0050 of C, 0.0015 to 0.0040 of Ti, 0.01 to 0.008 of Cr, up to 0.05 in total of Nb+Mo+V, balance Fe and unavoidable impurities up to a total amount of 1.0% and having a specific electrical resistance at 50° C. of 0.62 to 0.65µΩm. Also, a process for the production thereof and the use thereof in iron cores of rotating electric machines, in particular in electric motors, for example in electric vehicles or hybrid vehicles, and generators.

20 Claims, No Drawings

(56) References Cited

U.S. PATENT DOCUMENTS

| | | | |
|---|---|---|---|
| 2020/0063229 A1 | 2/2020 | Fischer et al. | |
| 2021/0062287 A1* | 3/2021 | Kim | C21D 8/1233 |
| 2023/0193413 A1* | 6/2023 | Fischer | C22C 38/04 |
| | | | 148/112 |

FOREIGN PATENT DOCUMENTS

| CN | 101343683 A | 1/2009 |
|---|---|---|
| CN | 110637098 A | 12/2019 |
| EP | 2612942 A1 | 7/2013 |
| EP | 2657355 A1 | 10/2013 |
| EP | 2767601 A1 | 8/2014 |
| EP | 2821511 A1 | 1/2015 |
| EP | 2826872 A1 | 1/2015 |
| EP | 2840157 A1 | 2/2015 |
| EP | 3263719 A1 | 1/2018 |
| EP | 3388537 A1 | 10/2018 |
| JP | H11222653 A | 8/1999 |
| JP | 200149402 A | 2/2001 |
| JP | 200173098 A | 3/2001 |
| JP | 2001158948 A | 6/2001 |
| JP | 2003253404 A | 9/2003 |
| JP | 2006144036 A | 6/2006 |
| JP | 200716278 A | 1/2007 |
| JP | 2011246810 A | 12/2011 |
| JP | 201236454 A | 2/2012 |
| JP | 201310982 A | 1/2013 |
| JP | 2016199787 A | 12/2016 |
| JP | 201821241 A | 2/2018 |
| KR | 1020140060725 A | 5/2014 |
| KR | 1020150073803 A | 7/2015 |
| WO | 0065103 A2 | 11/2000 |
| WO | 03038135 A1 | 5/2003 |
| WO | 2015170271 A1 | 11/2015 |
| WO | 2018210690 A1 | 11/2018 |

OTHER PUBLICATIONS

Metal Materials Engineering Experiment Course, General Higher Education 13th Five-Year Plan Textbook, Jul. 31, 2017, p. 54, Metallurgical Industry Press.

* cited by examiner

ELECTRIC STEEL STRIP OR SHEET FOR HIGHER FREQUENCY ELECTRIC MOTOR APPLICATIONS, WITH IMPROVED POLARIZATION AND LOW MAGNETIC LOSSES

CROSS-REFERENCE TO RELATED APPLICATIONS

This application is the United States national phase of International Application No. PCT/EP2019/080537 filed Nov. 7, 2019, and claims priority to International Application No. PCT/EP2018/080598 filed Nov. 8, 2018, the disclosures of which are hereby incorporated by reference in their entirety.

BACKGROUND OF THE INVENTION

Field of the Invention

The present invention relates to a non-oriented electrical steel strip or sheet having the following composition (all figures in % by weight): from 3.2 to 3.4 of Si, from 0.85 to 1.1 of Al, from 0.07 to 0.2 of Mn, from 0.01 to 0.04 of P, from 0.0003 to 0.0030 of S, from 0.0005 to 0.0025 of N, from 0.0010 to 0.0050 of C, from 0.0015 to 0.0040 of Ti, from 0.01 to 0.08 of Cr, up to 0.05 in total of Nb+Mo+V, balance Fe and unavoidable impurities up to a total amount of 1.0% by weight, characterized in that it has a specific electrical resistance at 50° C. of from 0.62 to 0.65 $\mu\Omega m$, a process for the production thereof and the use thereof in iron cores of rotating electric machines, in particular in electric motors, for example in electric vehicles or hybrid vehicles, and generators.

Description of Related Art

Non-oriented (NO) electrical steel strip or sheet is used for increasing the magnetic flux in iron cores of rotating electric machines, i.e. in motors and generators. Future highly efficient electric machines, e.g. electric motors having high speeds of rotation for electric vehicles, will require specific types of NO electrical steel strip or sheet having a low magnetic loss at high frequencies and high magnetic polarization or induction with high permeability.

Components manufactured from electrical steel strips or sheets of the type in question here require the abovementioned magnetic properties which often cannot be satisfied by the types of NO electrical steel strip or sheet available today. Non-oriented electrical steel strips and processes for the production thereof are already known from the prior art.

EP 2 612 942 discloses a non-oriented electrical steel strip or sheet composed of a steel which contains, apart from iron and unavoidable impurities, from 1.0 to 4.5% by weight of Si, up to 2.0% by weight of Al, up to 1.0% by weight of Mn, up to 0.01% by weight of C, up to 0.01% by weight of N, up to 0.012% by weight of S, from 0.1 to 0.5% by weight of Ti and from 0.1 to 0.3% by weight of P, where the ratio content of Ti/content of P, in each case in % by weight, satisfies 1.0≤content of Ti/content of P≤2.0. The non-oriented electrical steel strip or sheet and components for electrical applications manufactured from such a sheet or strip display increased strengths and at the same time good magnetic properties. The NO electrical steel strip or sheet according to EP 2 612 942 is produced by a hot-rolled strip consisting of a steel having the abovementioned composition being cold-rolled to give a cold-rolled strip and this cold-rolled strip subsequently being subjected to a final heat treatment. The polarizability at low frequencies and the mechanical properties of the electrical steel strips or sheets according to EP 2 612 942 are still in need of improvement.

EP 2 840 157 discloses a non-oriented electrical steel strip or sheet, in particular for electrical applications, produced from a steel which contains, apart from iron and unavoidable impurities, from 2.0 to 4.5% by weight of Si, from 0.03 to 0.3% by weight of Si, up to 2.0% by weight of Al, up to 1.0% by weight of Mn, up to 0.01% by weight of C, up to 0.01% by weight of N, up to 0.001% by weight of S and up to 0.015% by weight of P, with ternary Fe—Si—Zr precipitates being present in the structure of the electrical steel strip or sheet. EP 2 840 157 also discloses a process for producing such electrical steel strips and sheets which comprises a final heat treatment. The polarizability at low field strengths and the mechanical properties of the electrical steel strip according to EP 2 840 157 are still in need of improvement.

WO 00/65103 A2 discloses a process for producing non-oriented electrical steel strip, in which an intermediate steel material containing less than 0.06% by weight of C, 0.03 to 2.5% by weight of Si, less than 0.4% by weight of Al, from 0.05 to 1% by weight of Mn and less than 0.02% by weight of S is hot-rolled to give a hot-rolled strip having a thickness of less than 3.5 mm, subsequently pickled and after pickling rolled to give a cold-rolled strip having a thickness of from 0.2 to 1 mm. The mechanical properties and the magnetic properties of the electrical steel strip according to WO 00/65103 A2 are likewise capable of improvement.

SUMMARY OF THE INVENTION

In the light of the prior art, it was an object of the present invention to provide a non-oriented electrical steel strip or sheet and a component for electrical applications manufactured from such a strip or sheet, which non-oriented electrical steel strip or sheet in the lower modulation range from 100 to 20 A/m displays very high polarization values and at the same time low magnetic losses at relatively high frequencies of 400 Hz, 700 Hz and 1000 Hz.

In addition, a process for producing such an NO electrical steel strip or sheet which, as a result of a final heat treatment matched to the alloy indicated, displays particularly low magnetic losses at both low and relatively high frequencies combined with improved polarization values in the low modulation range was to be provided.

These objects are achieved by the inventive non-oriented electrical steel strip or sheet having the following composition (all figures in % by weight)
from 3.2 to 3.4 of Si,
from 0.85 to 1.1 of Al,
from 0.07 to 0.18 of Mn,
from 0.01 to 0.04 of P,
from 0.0003 to 0.0030 of S,
from 0.0005 to 0.0025 of N,
from 0.0010 to 0.0050 of C,
from 0.0015 to 0.0040 of Ti,
from 0.01 to 0.08 of Cr,
up to 0.05 in total of Nb+Mo+V,
balance Fe and unavoidable impurities up to a total amount of 1.0% by weight, and having a specific electrical resistance at 50° C. of from 0.62 to 0.65 $\mu\Omega m$.

Furthermore, the objects of the invention are achieved by the process for producing a non-oriented electrical steel strip or sheet according to the invention, comprising at least the following process steps:

(A) provision of a hot-rolled, hot strip annealed non-oriented electrical steel strip or sheet, preferably by means of the conventional manufacturing route via a continuous casting plant or by means of thin-slab manufacture, in a thickness of from 1.5 to 2.5 mm,
(B) cold rolling of the electrical steel strip or sheet from step (A) to a thickness of from 0.255 to 0.31 mm in order to obtain a cold-rolled strip,
(C) final heat treatment of the cold-rolled strip from step (B) in order to obtain the non-oriented electrical steel strip or sheet, and
(D) cooling of the finally heat-treated cold-rolled strip from step (C) at a usual average cooling rate of from 1 K/s to 10 K/s in a nonoxidizing atmosphere, in particular containing relatively high hydrogen contents above 70%, to a lower limiting temperature of 500° C.,
wherein the cold-rolled strip from step (B) is, in step (C), firstly heated at a heating rate of at least 40 K/s to a temperature of from 860 to 940° C., preferably from 880 to 920° C., and subsequently heated at a heating rate of from 3 to 20 K/s to a temperature of from 1050 to 1070° C., by a component manufactured from such an electrical steel strip or sheet and by the use of this non-oriented electrical steel strip or sheet in iron cores of rotating electric machines, in particular in electric motors, for example in electric vehicles or hybrid vehicles, and generators.

The non-oriented electrical steel strip or sheet of the invention has an improved polarization J at from 100 to 200 A/m and an improved permeability in the range from 0.8 to 1.2 T. At the same time, the magnetic losses both at low frequencies of, for example, 50 Hz and at higher frequencies of from 400 to 1000 Hz are reduced compared to materials of the prior art. This behavior is achieved according to the invention by the precisely adapted alloy composition and a specifically adapted heat treatment during production.

DESCRIPTION OF THE INVENTION

The present invention provides a non-oriented electrical steel strip or sheet having the following composition (all figures in % by weight)
from 3.20 to 3.40 of Si, preferably from 3.25 to 3.35 of Si,
from 0.85 to 1.1 of Al, preferably from 0.95 to 1.05 of Al,
from 0.07 to 0.18 of Mn, preferably from 0.14 to 0.16 of Mn,
from 0.01 to 0.04 of P, preferably from 0.015 to 0.02 of P,
from 0.0003 to 0.0030 of S, preferably from 0.0005 to 0.002 of S,
from 0.0005 to 0.0025 of N, preferably from 0.001 to 0.002 of N,
from 0.0010 to 0.0050 of C, preferably from 0.0015 to 0.0025 of C,
from 0.0015 to 0.0040 of Ti, preferably from 0.0017 to 0.0035 of Ti,
from 0.01 to 0.08 of Cr, preferably from 0.02 to 0.06, particularly preferably from 0.02 to 0.04 of Cr, up to 0.05 in total of Nb+Mo+V,
balance Fe and unavoidable impurities up to a total amount of 1.0% by weight, and having a specific electrical resistance at 50° C. of from 0.62 to 0.65 µΩm.

For the purposes of the present invention, unavoidable impurities are, for example, C, S, N, Ti, Cr, Ni, Cu, As, Pb and Bi.

The non-oriented electrical steel strip or sheet of the invention has a specific electrical resistance at 50° C. of from 0.62 to 0.65 µΩm. Methods for determining the specific electrical resistance are known per se to a person skilled in the art. Methods for determining the specific electrical resistance are known per se to a person skilled in the art, for example by means of a four-point measurement in accordance with DIN EN 60404-13: 2008-05 "Magnetic materials part 13: Methods of measurement of resistivity, density and stacking factor of electrical steel strip and sheet".

A relatively high specific electrical resistance leads to a lowering of the magnetic loss as a result of lowering of the eddy current losses arising at increasing frequency.

For the purposes of the present invention, electrical steel strip means that the material according to the invention is present in the form of a steel strip, i.e. the length of the steel strip is significantly greater than the width. For the purposes of the present invention, electrical steel sheet means that the material according to the invention is present in the form of sheets, with the width and length of these sheets not being restricted in terms of size except by the width and length of the steel strip from which they are preferably obtained. In a preferred embodiment, the electrical steel sheets of the invention are obtained from the electrical steel strips of the invention by cutting or stamping.

The electrical steel sheets of the invention can, for example, be brought to an appropriate shape in order then to be used in the stator or rotor of an electric motor.

Furthermore, the present invention provides the non-oriented electrical steel strip or sheet according to the invention, wherein the sum of C, S, N and Ti is not more than 0.0090% by weight.

The inventive non-oriented electrical steel strip or sheet according to the present invention has a final thickness of from 0.255 to 0.31 mm. For the purposes of the present invention, "final thickness" means the thickness of the non-oriented electrical steel strip or sheet after cold rolling, i.e. in the form in which it is also used later, for example in electric motors.

The present invention further preferably provides the non-oriented electrical steel strip or sheet of the invention, wherein a heat treatment step at a maximum temperature of from 1050 to 1070° C., preferably from 1055 to 1065° C., is carried out during its production. This particular method of production gives a corresponding electrical steel strip or sheet which has an improved polarization J at from 100 to 200 A/m and an improved permeability in the range from 0.8 to 1.2 T. At the same time, the magnetic losses are reduced both at low frequencies of, for example, 50 Hz and also at higher frequencies of from 400 to 1000 Hz compared to materials of the prior art.

For example, the present invention provides the non-oriented electrical steel strip or sheet of the invention which at a polarization P of 1.5 T and 50 Hz has loss values of not more than 2.3 W/kg, in each case at a sheet thickness of from 0.280 to 0.310 mm, and loss values of not more than 2.2 W/kg, in each case at a sheet thickness of from 0.255 to 0.280 mm.

The present invention preferably provides the non-oriented electrical steel strip or sheet according to the invention which at a polarization P of 1.0 T and 400 Hz has loss values of not more than 14.2 W/kg, in each case at a sheet thickness of from 0.280 to 0.310 mm, and loss values of not more than 13.55 W/kg, in each case at a sheet thickness of from 0.255 to 0.280 mm.

The present invention preferably provides the non-oriented electrical steel strip or sheet according to the invention which at a polarization P of 1.0 T and 700 Hz has loss values of not more than 33 W/kg, in each case at a sheet thickness of from 0.280 to 0.310 mm, and loss values of not more than 31.5 W/kg, in each case at a sheet thickness of from 0.255 to 0.280 mm.

The present invention preferably provides the non-oriented electrical steel strip or sheet according to the invention which at a polarization P of 1.0 T and 1000 Hz has loss values of not more than 58 W/kg, in each case at a sheet thickness of from 0.280 to 0.310 mm, and loss values of not more than 55 W/kg, in each case at a sheet thickness of from 0.255 to 0.280 mm.

Furthermore, the non-oriented electrical steel strip or sheet of the invention has a particularly advantageous, i.e. high, ratio of the polarization J at 50 Hz and 100 A/m and the magnetic loss P at 1 T and 400 Hz. This ratio is described by the formula (1) below:

$$100 * J_{100A/m}, 50 \text{ Hz}/P_{1.0T}, 400 \text{ Hz} \qquad (1)$$

The present invention preferably provides the non-oriented electrical steel strip or sheet according to the invention in which the ratio multiplied by 100 of the polarization J at 50 Hz and 100 A/m and the magnetic loss P at 1 T and 400 Hz is at least 6.8, preferably at least 7.0.

Furthermore, the non-oriented electrical steel strip or sheet according to the invention has an advantageous, i.e. high, ratio multiplied by 100 of the polarization J at 400 Hz and 100 A/m and the magnetic loss P at 1 T and 400 Hz. This ratio is described by the formula (2) below:

$$100 * J_{100A/m} 400 \text{ Hz}/P_{1.0T} 400 \text{ Hz} \qquad (2)$$

The present invention preferably provides the non-oriented electrical steel strip or sheet according to the invention in which the ratio of the polarization J at 400 Hz and 100 A/m and the magnetic loss P at 1 T and 400 Hz is at least 6.0, preferably at least 6.1.

Furthermore, the non-oriented electrical steel strip or sheet according to the invention preferably has a polarization J at a modulation of 2500 A/m of at least 1.53 T, at 5000 A/m of at least 1.63 and/or at 10 000 A/m of at least 1.75, in each case at a sheet thickness of from 0.280 to 0.310 mm, and a polarization J at a modulation of 2500 A/m of at least 1.52 T, at 5000 A/m of at least 1.62 and/or at 10 000 A/m of at least 1.75, in each case at a sheet thickness of from 0.255 to 0.280 mm.

The present invention also provides the process for producing a non-oriented electrical steel strip or sheet according to the invention, comprising at least the following process steps:

(A) provision of a hot-rolled, hot strip annealed non-oriented electrical steel strip or sheet, preferably by means of the conventional manufacturing route via a continuous casting plant, in a thickness of from 1.5 to 2.5 mm,
(B) cold rolling of the electrical steel strip or sheet from step (A) to a thickness of from 0.255 to 0.310 mm in order to obtain a cold-rolled strip,
(C) final heat treatment of the cold-rolled strip from step (B) in order to obtain the non-oriented electrical steel strip or sheet, and
(D) cooling of the finally heat-treated cold-rolled strip from step (C) at a usual average cooling rate of from 1 K/s to 10 K/s in a nonoxidizing atmosphere, in particular containing relatively high hydrogen contents above 70%, to a lower limiting temperature of 500° C., wherein the cold-rolled strip from step (B) is, in step (C), firstly heated at a heating rate of at least 40 K/s to a temperature of from 860 to 940° C., preferably from 880 to 920° C., and subsequently heated at a heating rate of from 3 to 20 K/s to a temperature of from 1050 to 1070° C., preferably from 1055 to 1065° C.

The individual steps of the process of the invention are described in detail below.

Step (A) of the process of the invention comprises provision of a hot-rolled, non-oriented electrical steel strip or sheet, preferably by means of the conventional manufacturing route via a continuous casting plant or by means of thin-slab manufacture, in a thickness of from 1.5 to 2.5 mm.

The hot-rolled, non-oriented electrical steel strip or sheet provided in step (A) of the process of the invention has the abovementioned composition. The provision of a hot-rolled, non-oriented electrical steel strip in step (A) of the process of the invention is preferably carried out by means of the conventional manufacturing route via a continuous casting plant or by means of thin-slab manufacture.

The production of the hot-rolled strip provided according to the invention can be carried out largely conventionally. For this purpose, a steel melt having a composition corresponding to that prescribed according to the invention can firstly be melted and cast to give an intermediate material which can, in the case of conventional manufacture, be a slab or thin slab.

The intermediate material produced in this way can subsequently be brought to an intermediate material temperature of from 1020 to 1300° C. For this purpose, the intermediate material is reheated if necessary or maintained at the respective target temperature utilizing the heat of casting.

The intermediate material which has been heated in this way can then be hot-rolled to give a hot-rolled strip having a thickness which is typically from 1.5 to 2.5 mm. Hot rolling commences in a manner known per se at an initial hot rolling temperature in the finishing train of from 1000 to 1150° C. and ends with a final hot rolling temperature of from 700 to 920° C., in particular from 780 to 850° C.

The hot-rolled strip obtained can subsequently be cooled to a reel temperature and reeled up to give a coil. The reel temperature is ideally selected so that problems are avoided in the cold rolling subsequently carried out. In practice, the reel temperature is for this purpose not more than, for example, 700° C.

The hot-rolled electrical steel strip or sheet from step (A) can be used directly in step (B) of the process of the invention. In a preferred embodiment of the process of the invention, the present invention provides the process according to the invention in which a heat treatment in a bell furnace is carried out at a temperature of from 700 to 800° C., preferably at a temperature of from 720 to 760° C., in a step (A') after step (A), i.e. before step (B). Thus, a hot-rolled, hot strip annealed, non-oriented electrical steel strip or sheet is, in a preferred embodiment, provided for step (B), preferably by means of the conventional manufacturing route via a continuous casting plant or by means of thin-slab manufacture, in a thickness of from 1.5 to 2.5 mm.

Step (B) of the process of the invention comprises cold rolling of the electrical steel strip or sheet from step (A) to a thickness of from 0.255 to 0.310 mm in order to obtain a cold-rolled strip.

Step (B) of the process of the invention can generally be carried out by all methods known to a person skilled in the art.

The cold-rolled strip obtained from step (B) can be transferred directly to step (C) of the process of the invention.

Step (C) of the process of the invention comprises final heat treatment of the cold-rolled strip from step (B) in order to obtain the non-oriented electrical steel strip or sheet, with the cold-rolled strip from step (B) being, in step (C), firstly heated at a heating rate of at least 40 K/s to a temperature of from 860 to 940° C., preferably from 880 to 920° C., and subsequently heated at a heating rate of from 3 to 20 K/s to a temperature of from 1050 to 1070° C., preferably from 1055 to 1065° C.

The final heat treatment in step (C) of the process of the invention comprises at least the two substeps mentioned, and further heating and/or cooling steps can optionally be gone through.

The cold-rolled strip obtained from step (B) is, in step (C), firstly heated at a heating rate of at least 3 to 20 K/s to a temperature of from 860 to 940° C., preferably from 880 to 920° C.

Step (C) of the process of the invention can in principle be carried out in any apparatus known to a person skilled in the art, in particular in a continuous furnace, particularly preferably in a horizontal continuous furnace.

In a preferred embodiment of the process of the invention, step (C) is carried out at low strip tensions. This has the advantage that only small forces are exerted on the cold-rolled strip during the heat treatment step, so that the anisotropy of the magnetic losses in the longitudinal and transverse directions remains very low. The present invention therefore preferably provides the process of the invention in which step (C) is carried out at strip tensions of not more than 10 N/mm².

Step (C) of the process of the invention is preferably carried out in a reducing atmosphere. Particular preference is given to step (C) of the process of the invention being carried out in a heat treatment atmosphere containing at least 70% by volume, in particular at least 85% by volume, of hydrogen. Apart from hydrogen, nitrogen may also be present in the heat treatment atmosphere. Nitrogen leads, as a result of nitriding of the surface, to a deterioration in the magnetic properties.

Step (C) of the process of the invention is preferably carried out at a low dew point. Step (C) of the process of the invention is preferably carried out at a dew point of not more than −10° C., particularly preferably not more than −20° C.

Step (D) of the process of the invention comprises cooling of the finally heat-treated cold-rolled strip from step (C) at a usual average cooling rate of from 1 K/s to 10 K/s in a nonoxidizing atmosphere, in particular with relatively high proportions of hydrogen of above 70%, to a lower limiting temperature of 500° C.

After step (D) of the process of the invention, the non-oriented electrical steel strip according to the invention is in principle present in the form in which it can be used in the applications described. The non-oriented electrical steel strip obtained from step (D) can optionally be subjected to further process steps, for example cleaning, coiling, cutting and/or stamping into electrical steel sheets, etc.

The present invention thus also provides an inventive non-oriented electrical steel strip or sheet as described above having the appropriate composition and produced in a process according to the invention comprising at least the process steps (A) to (D), as described above.

The present invention also provides a component for electrical applications which has been manufactured from the non-oriented electrical steel strip or sheet according to the invention, in particular iron cores of rotating electric machines, in particular in electric motors, for example in electric vehicles or hybrid vehicles, and generators. Corresponding processes for producing such components are known per se to a person skilled in the art, for example stamping, cutting, laser cutting, adhesive bonding, etc.

The present invention also provides for the use of the non-oriented electrical steel strip or sheet according to the invention in iron cores of rotating electric machines, in particular in electric motors, for example in electric vehicles or hybrid vehicles, and generators.

The magnetic losses P can, according to the invention, be determined by all methods known to a person skilled in the art, in particular by means of an Epstein frame, in particular in accordance with DIN EN 60404-2:2009-01: Magnetic material part 2: Methods of measurement of the magnetic properties of electrical steel strip and sheet by means of an Epstein frame". Here, appropriate electrical steel sheets are cut into longitudinal and transverse strips and measured as mixed specimen in the Epstein frame.

The non-oriented electrical steel strip described here displays an anisotropy of the magnetic loss values at 1.5 T and 50 Hz in the longitudinal direction and transverse direction of less than 20%.

EXAMPLES

The working examples below serve to illustrate the invention. The steel compositions used are shown in table 1.

TABLE 1

| | Steel compositions | | | | | | | | | |
|---|---|---|---|---|---|---|---|---|---|---|
| Analysis | C | Si | Mn | P | S | Al | N | Ti | Cr | Spec. el. resistance at 50° C. [µΩm] |
| P2 | 0.0020 | 3.22 | 0.154 | 0.009 | 0.0009 | 0.735 | 0.0023 | 0.0018 | 0.024 | 0.596 |
| P3 | 0.0030 | 3.23 | 0.158 | 0.012 | 0.0005 | 0.783 | 0.0010 | 0.0021 | 0.026 | 0.604 |
| P4 | 0.0014 | 3.20 | 0.153 | 0.009 | 0.0005 | 0.780 | 0.0011 | 0.0016 | 0.021 | 0.600 |
| P7 | 0.0017 | 3.23 | 0.155 | 0.012 | 0.0005 | 0.758 | 0.0014 | 0.0017 | 0.022 | 0.601 |
| P6 | 0.002 | 3.21 | 0.156 | 0.01 | 0.0005 | 0.733 | 0.0016 | 0.0024 | 0.022 | 0.595 |
| P5 | 0.0023 | 3.25 | 0.143 | 0.150 | 0.0013 | 0.951 | 0.0013 | 0.0027 | 0.022 | 0.647 |
| 1 | 0.0023 | 3.25 | 0.143 | 0.015 | 0.0013 | 0.951 | 0.0013 | 0.0027 | 0.022 | 0.628 |
| 2 | 0.0015 | 3.32 | 0.147 | 0.016 | 0.0005 | 0.976 | 0.0013 | 0.0021 | 0.031 | 0.640 |
| 3 | 0.0019 | 3.26 | 0.144 | 0.017 | 0.0017 | 0.993 | 0.0019 | 0.0019 | 0.030 | 0.635 |
| 4 | 0.0022 | 3.25 | 0.156 | 0.014 | 0.0005 | 0.968 | 0.0009 | 0.0032 | 0.032 | 0.631 |
| 5 | 0.0019 | 3.29 | 0.148 | 0.012 | 0.0012 | 1.03 | 0.0012 | 0.0021 | 0.033 | 0.643 |

All figures are, unless indicated otherwise, in % by weight, balance Fe and unavoidable impurities.

Examples 10 to 20 and 22 to 33 according to the invention and comparative specimens V1 to V9 and V21 were produced. For this purpose, the slab obtained in each case after melting the compositions as per table 1 was hot-rolled, (optionally) subjected to a hot-rolled strip bell furnace heat treatment at 740° C. and pickled. The material was subsequently cold-rolled to a final thickness of from 0.255 to 0.310 mm (see tables 2 and 3) and then subjected to final heat treatment. The comparative specimens V1 to V9 and V21 and the examples 10 to 20 and 22 to 33 according to the invention were finally heat-treated at the heat treatment temperatures indicated in tables 2 and 3. The thicknesses obtained are likewise indicated in tables 2 and 3.

The characteristic magnetic properties, i.e. J 100 A/m 50 Hz, J 100 A/m 400 Hz, J 2500 A/m, J 5000 A/m, J 10 000 A/m, P1.5 T 50 Hz, P1.0 T 400 Hz, P1.0 T 700 Hz and P1.0 T 1000 Hz, were determined in each case for specimens after the final heat treatment. Furthermore, the following ratios were determined:

$$J_{100 A/m} 50\ Hz / P_{1.0 T} 400\ Hz \tag{1}$$

$$J_{100 A/m} 400\ Hz / P_{1.0 T} 400\ Hz \tag{2}$$

TABLE 2

Examples according to the invention and comparative examples, nominal thickness 0.30 mm

| No. | Analysis | Heat treatment temp. [° C.] | Average heating rate 1 | Average heating rate 2 | Actual Thickness [mm] | J 100 50 Hz [T] | J 100 400 Hz [T] | J 2500 [T] |
|---|---|---|---|---|---|---|---|---|
| V1 | P2 | 1030 | — | — | 0.298 | 0.868 | 0.743 | 1.56 |
| V2 | P3 | 1030 | — | — | 0.302 | 0.926 | 0.780 | 1.56 |
| V3 | P4 | 1030 | — | — | 0.303 | 0.933 | 0.792 | 1.55 |
| V4 | P7 | 1090 | — | — | 0.284 | 0.935 | 0.838 | 1.52 |
| V5 | P5 | 1015 | — | — | 0.293 | 0.894 | 0.774 | 1.55 |
| V6 | 3 | 1080 | — | — | 0.285 | 0.943 | 0.861 | 1.528 |
| V7 | 1 | 1090 | — | — | 0.291 | 0.971 | 0.866 | 1.537 |
| V8 | 2 | 1090 | — | — | 0.290 | 0.876 | 0.785 | 1.512 |
| V9 | 3 | 1100 | — | — | 0.291 | 0.936 | 0.820 | 1.547 |
| 10 | 3 | 1060 | 45 | 5 | 0.285 | 0.994 | 0.892 | 1.552 |
| 11 | 3 | 1060 | 45 | 5 | 0.287 | 0.999 | 0.897 | 1.552 |
| 12 | 2 | 1060 | 44 | 4 | 0.283 | 0.969 | 0.890 | 1.537 |
| 13 | 3 | 1060 | 44 | 5 | 0.291 | 0.978 | 0.862 | 1.560 |
| 14 | 3 | 1060 | 45 | 5 | 0.288 | 1.008 | 0.890 | 1.566 |
| 15 | 2 | 1060 | 44 | 5 | 0.288 | 1.008 | 0.924 | 1.539 |
| 16 | 2 | 1060 | 45 | 5 | 0.288 | 0.983 | 0.886 | 1.535 |
| 17 | 1 | 1060 | 45 | 5 | 0.287 | 0.990 | 0.884 | 1.548 |
| 18 | 1 | 1060 | 45 | 5 | 0.288 | 0.999 | 0.894 | 1.546 |
| 19 | 3 | 1060 | 45 | 5 | 0.287 | 1.001 | 0.881 | 1.554 |
| 20 | 3 | 1060 | 45 | 5 | 0.291 | 0.971 | 0.852 | 1.561 |

| No. | J 5000 [T] | J 10000 [T] | P1.5 50 Hz [W/kg] | P1.0 400 Hz [W/kg] | P1.0 700 Hz [W/kg] | P1.0 1000 Hz [W/kg] | (1) | (2) |
|---|---|---|---|---|---|---|---|---|
| V1 | 1.65 | 1.77 | 2.37 | 15.5 | 44.2 | 62.9 | 5.60 | 4.79 |
| V2 | 1.65 | 1.77 | 2.33 | 15.2 | 35.4 | 62.1 | 6.09 | 5.13 |
| V3 | 1.65 | 1.77 | 2.42 | 15.5 | 43.9 | 62.6 | 6.02 | 5.11 |
| V4 | 1.62 | 1.76 | 2.20 | 14.8 | 43 | 61.2 | 6.32 | 5.66 |
| V5 | 1.64 | 1.76 | 2.40 | 15.1 | 34.8 | 60.8 | 5.92 | 5.12 |
| V6 | 1.626 | 1.755 | 2.21 | 14.22 | 33.15 | 57.8 | 6.63 | 6.05 |
| V7 | 1.637 | 1.765 | 2.11 | 14.44 | 34.06 | 59.9 | 6.72 | 6.00 |
| V8 | 1.615 | 1.749 | 2.43 | 15.21 | — | — | 5.76 | 5.16 |
| V9 | 1.646 | 1.772 | 2.15 | 14.55 | 34.01 | 58.4 | 6.43 | 5.64 |
| 10 | 1.648 | 1.771 | 2.15 | 13.91 | 32.2 | 56.2 | 7.15 | 6.41 |
| 11 | 1.648 | 1.771 | 2.15 | 13.88 | 32.2 | 56.3 | 7.20 | 6.46 |
| 12 | 1.632 | 1.757 | 2.20 | 13.83 | 32.0 | 55.9 | 7.00 | 6.43 |
| 13 | 1.652 | 1.770 | 2.26 | 14.17 | 32.6 | 57.0 | 6.90 | 6.08 |
| 14 | 1.659 | 1.778 | 2.17 | 13.82 | 32.4 | 56.3 | 7.30 | 6.44 |
| 15 | 1.635 | 1.759 | 2.18 | 13.67 | 31.7 | 55.5 | 7.38 | 6.76 |
| 16 | 1.630 | 1.754 | 2.19 | 13.89 | 32.4 | 56.6 | 7.08 | 6.38 |
| 17 | 1.644 | 1.767 | 2.17 | 14.03 | 32.8 | 57.6 | 7.06 | 6.30 |
| 18 | 1.641 | 1.764 | 2.16 | 13.99 | 32.7 | 57.3 | 7.14 | 6.39 |
| 19 | 1.650 | 1.772 | 2.18 | 13.98 | 32.6 | 57.0 | 7.16 | 6.30 |
| 20 | 1.656 | 1.777 | 2.19 | 14.08 | 32.7 | 57.2 | 6.89 | 6.05 |

TABLE 3

Examples according to the invention and comparative examples, nominal thickness 0.27 mm

| No. | Analysis | Heat treatment temp. [° C.] | Average heating rate 1 | Average heating rate 2 | Actual thickness [mm] | J 100 50 Hz [T] | J 100 400 Hz [T] | J 2500 [T] |
|---|---|---|---|---|---|---|---|---|
| V21 | P6 | 1030 | — | — | 0.266 | 0.939 | — | 1.530 |
| 22 | 4 | 1060 | 50 | 5 | 0.265 | 0.937 | 0.877 | 1.524 |
| 23 | 4 | 1060 | 50 | 5 | 0.272 | 0.966 | 0.896 | 1.531 |
| 24 | 4 | 1060 | 50 | 5 | 0.258 | 0.938 | 0.883 | 1.532 |
| 25 | 4 | 1060 | 50 | 5 | 0.264 | 0.996 | 0.948 | 1.527 |
| 26 | 5 | 1060 | 50 | 5 | 0.269 | 0.990 | 0.924 | 1.542 |
| 27 | 5 | 1060 | 50 | 5 | 0.263 | 0.991 | 0.935 | 1.536 |
| 28 | 5 | 1060 | 50 | 5 | 0.260 | 0.958 | 0.896 | 1.534 |
| 29 | 5 | 1060 | 50 | 5 | 0.259 | 0.969 | 0.914 | 1.536 |
| 30 | 5 | 1060 | 50 | 5 | 0.257 | 0.985 | 0.929 | 1.529 |
| 31 | 5 | 1060 | 50 | 5 | 0.268 | 0.978 | 0.909 | 1.532 |
| 32 | 5 | 1060 | 50 | 5 | 0.259 | 0.923 | 0.868 | 1.531 |
| 33 | 5 | 1060 | 50 | 5 | 0.259 | 0.943 | 0.880 | 1.529 |

| No. | J 5000 [T] | J 10000 [T] | P1.5 50 Hz [W/kg] | P1.0 400 Hz [W/kg] | P1.0 700 Hz [W/kg] | P1.0 1000 Hz [W/kg] | (1) | (2) |
|---|---|---|---|---|---|---|---|---|
| V21 | 1.630 | 1.750 | 2.39 | 14.10 | 39.60 | 55.8 | — | — |
| 22 | 1.621 | 1.750 | 2.18 | 13.42 | 30.86 | 53.5 | 6.98 | 6.53 |
| 23 | 1.628 | 1.757 | 2.15 | 13.53 | 31.36 | 54.6 | 7.14 | 6.63 |
| 24 | 1.630 | 1.759 | 2.10 | 13.12 | 30.19 | 52.3 | 7.15 | 6.73 |
| 25 | 1.624 | 1.754 | 2.11 | 12.99 | 30.03 | 52.2 | 7.67 | 7.29 |
| 26 | 1.637 | 1.764 | 2.09 | 13.21 | 30.51 | 53.1 | 7.50 | 7.00 |
| 27 | 1.633 | 1.759 | 2.13 | 13.10 | 30.05 | 52.1 | 7.57 | 7.14 |
| 28 | 1.630 | 1.758 | 2.14 | 13.13 | 30.07 | 52.0 | 7.29 | 6.83 |
| 29 | 1.632 | 1.760 | 2.12 | 13.02 | 29.89 | 51.8 | 7.44 | 7.02 |
| 30 | 1.626 | 1.754 | 2.15 | 13.00 | 29.75 | 51.4 | 7.57 | 7.15 |
| 31 | 1.629 | 1.757 | 2.12 | 13.35 | 30.76 | 53.3 | 7.33 | 6.81 |
| 32 | 1.626 | 1.753 | 2.19 | 13.23 | 30.04 | 51.8 | 6.98 | 6.56 |
| 33 | 1.626 | 1.753 | 2.18 | 13.29 | 30.37 | 52.6 | 7.10 | 6.62 |

— not determined

INDUSTRIAL APPLICABILITY

The non-oriented electrical steel strip or sheet of the invention displays improved polarization at from 100 to 200 A/m, an improved permeability at from 0.8 to 1.2 T and at the same time decreased magnetic losses at low frequencies of 50 Hz and at higher frequencies of from 400 to 1000 Hz. It can therefore advantageously be used in rotating electric machines, in particular in electric motors and generators.

The invention claimed is:

1. A non-oriented electrical steel strip or sheet comprising, in % by weight:
3.20 to 3.40 of Si,
0.85 to 1.10 of Al,
0.07 to 0.18 of Mn,
0.01 to 0.04 of P,
0.0003 to 0.0030 of S,
0.0005 to 0.0025 of N,
0.0010 to 0.0050 of C,
0.0015 to 0.0040 of Ti,
0.01 to 0.08 of Cr, up to 0.05 in total of Nb+Mo+V,
balance Fe and unavoidable impurities below 1% by weight,
wherein the steel strip or sheet in a cold rolled and annealed condition with a thickness of 0.255-0.310 mm has a specific electrical resistance at 50° C. of 0.62 to 0.65 μΩm and loss values of not more than 14.2 W/kg at a polarization of 1.0 T and 400 Hz at a sheet thickness of 0.280 to 0.31 mm and not more than 13.6 W/kg at a polarization of 1.0 T and 400 Hz at a sheet thickness of 0.255 to 0.280 mm.

2. The non-oriented electrical steel strip or sheet according to claim 1, wherein a ratio multiplied by 100 of the polarization at 50 Hz and 100 A/m and the magnetic loss at 1 T and 400 Hz is at least 6.8.

3. The non-oriented electrical steel strip or sheet according to claim 1, wherein a ratio multiplied by 100 of the polarization at 400 Hz and 100 A/m and the magnetic loss at 1 T and 400 Hz is at least 6.0.

4. The non-oriented electrical steel strip or sheet according to claim 1, wherein a sum of C, S, N and Ti is not more than 0.0090% by weight.

5. The non-oriented electrical steel strip or sheet according to claim 1, wherein a heat treatment step at a maximum temperature of 1050 to 1070° C. is carried out during the production of the steel strip or sheet.

6. The non-oriented electrical steel strip or sheet according to claim 1, wherein a polarization at a modulation of 2500 A/m is at least 1.53 T, at 5000 A/m is at least 1.63 and/or at 10 000 A/m is at least 1.75 T, in each case, at a sheet thickness of 0.280 to 0.31 mm, and a polarization at a modulation of 2500 A/m of at least 1.52 T, at 5000 A/m of at least 1.62 and/or at 10 000 A/m of at least 1.75, in each case, at a sheet thickness of 0.255 to 0.280 mm.

7. A process for producing a non-oriented electrical steel strip or sheet according to claim 1, comprising at least the following process steps:
(A) providing a hot-rolled, hot strip annealed non-oriented electrical steel strip or sheet in a thickness of 1.5 to 2.5 mm, (B) cold rolling the electrical steel strip or sheet from step (A) to a thickness of 0.255 to 0.31 mm in order to obtain a cold-rolled strip, (C) final heat treating the cold-rolled strip from step (B) in order to obtain the non-oriented electrical steel strip or sheet, and (D) cooling the finally heat-treated cold-rolled strip from step (C) at a usual average cooling rate of from 1 K/s to 10 K/s in a nonoxidizing atmosphere to a lower limiting temperature of 500° C., wherein the cold-rolled strip from step (B) is, in step (C), firstly heated at a heating rate of at least 40 K/s to a temperature of 860 to 940° C. and subsequently heated at a heating rate of from 3 to 20 K/s to a temperature of 1050 to 1070° C.

8. The process according to claim 7, wherein step (C) is carried out at strip tensions of not more than 10 N/mm².

9. The process according to claim 7, wherein step (C) is carried out in a heat treatment atmosphere containing at least 70% by volume of hydrogen.

10. The process according to claim 7, wherein step (C) is carried out at a dew point of not more than −10° C.

11. The process according to claim 7, wherein a hot-rolled, hot strip annealed, non-oriented electrical steel strip or sheet is provided for step (B) in a thickness of from 1.5 to 2.5 mm.

12. The process according to claim 7, wherein the hot-rolled, hot strip annealed non-oriented electrical steel strip or sheet is produced via continuous casting or thin-slab casting.

13. The process according to claim 7, wherein the cold-rolled strip from step (B) is, in step (C), firstly heated at a heating rate of at least 40 K/s to a temperature of 880 to 920° C.

14. A component for electrical applications comprising a non-oriented electrical steel strip or sheet according to claim 1.

15. The component of claim 14, wherein the component is an iron core of a rotating electrical machine.

16. The component of claim 15, wherein the electrical machine is an electric motor or a generator.

17. An iron core of a rotating electric machine comprising a non-oriented electrical steel strip or sheet according to claim 1.

18. The iron core of claim 17, wherein the rotating electric machine is an electric motor or a generator.

19. A non-oriented electrical steel strip or sheet comprising, in % by weight:
3.20 to 3.40 of Si,
0.85 to 1.10 of Al,
0.07 to 0.18 of Mn,
0.01 to 0.04 of P,
0.0003 to 0.0030 of S,
0.0005 to 0.0025 of N,
0.0010 to 0.0050 of C,
0.0015 to 0.0040 of Ti,
0.01 to 0.08 of Cr, up to 0.05 in total of Nb+Mo+V,
balance Fe and unavoidable impurities below 1% by weight,
wherein the steel strip or sheet in a cold rolled and annealed condition with a thickness of 0.255-0.310 mm has a specific electrical resistance at 50° C. of 0.62 to 0.65 µΩm and has loss values of not more than 2.3 W/kg at a polarization of 1.5 T and 50 Hz, not more than 14.2 W/kg at a polarization of 1.0 T and 400 Hz, not more than 33 W/kg at a polarization of 1.0 T and 700 Hz, not more than 58 W/kg at a polarization of 1.0 T and 1000 Hz, in each case, at a sheet thickness of 0.280 to 0.31 mm, and the steel strip or sheet has loss values of not more than 2.2 W/kg at a polarization of 1.5 T and 50 Hz, not more than 13.6 W/kg at a polarization of 1.0 T and 400 Hz, not more than 32 W/kg at a polarization of 1.0 T and 700 Hz, not more than 55 W/kg at a polarization of 1.0 T and 1000 Hz, in each case, at a sheet thickness of 0.255 to 0.280 mm.

20. A non-oriented electrical steel strip or sheet comprising, in % by weight:
3.20 to 3.40 of Si,
0.85 to 1.10 of Al,
0.07 to 0.18 of Mn,
0.01 to 0.04 of P,
0.0003 to 0.0030 of S,
0.0005 to 0.0025 of N,
0.0010 to 0.0050 of C,
0.0015 to 0.0040 of Ti,
0.01 to 0.08 of Cr, up to 0.05 in total of Nb+Mo+V,
balance Fe and unavoidable impurities below 1% by weight,
wherein the steel strip or sheet in a cold rolled and annealed condition with a thickness of 0.255-0.310 mm has a specific electrical resistance at 50° C. of 0.62 to 0.65 µΩm, and
wherein a polarization at a modulation of 2500 A/m is at least 1.53 T, at 5000 A/m is at least 1.63 and/or at 10 000 A/m is at least 1.75 T, in each case, at a sheet thickness of 0.280 to 0.31 mm, and a polarization at a modulation of 2500 A/m of at least 1.52 T, at 5000 A/m of at least 1.62 and/or at 10 000 A/m of at least 1.75, in each case, at a sheet thickness of 0.255 to 0.280 mm.

\* \* \* \* \*